(12) United States Patent
Kim et al.

(10) Patent No.: US 10,991,939 B2
(45) Date of Patent: Apr. 27, 2021

(54) NEGATIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Yongseok Kim, Yongin-si (KR); Jaehou Nah, Yongin-si (KR); Yeonjoo Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 234 days.

(21) Appl. No.: 16/180,617

(22) Filed: Nov. 5, 2018

(65) Prior Publication Data

US 2019/0140262 A1      May 9, 2019

(30) Foreign Application Priority Data

Nov. 8, 2017    (KR) .................. 10-2017-0148248

(51) Int. Cl.
| | |
|---|---|
| H01M 4/36 | (2006.01) |
| H01M 4/133 | (2010.01) |
| H01M 4/134 | (2010.01) |
| H01M 4/38 | (2006.01) |
| H01M 4/587 | (2010.01) |
| H01M 10/0525 | (2010.01) |
| H01M 4/02 | (2006.01) |

(52) U.S. Cl.
CPC ........... *H01M 4/364* (2013.01); *H01M 4/133* (2013.01); *H01M 4/134* (2013.01); *H01M 4/362* (2013.01); *H01M 4/381* (2013.01); *H01M 4/386* (2013.01); *H01M 4/587* (2013.01); *H01M 10/0525* (2013.01); *H01M 2004/027* (2013.01); *H01M 2300/0037* (2013.01)

(58) Field of Classification Search
CPC ...... H01M 4/362; H01M 4/364; H01M 4/134; H01M 2/1686
See application file for complete search history.

(56) References Cited

U.S. PATENT DOCUMENTS

| | | | |
|---|---|---|---|
| 8,795,890 B2* | 8/2014 | Lee ................... | H01M 4/485 |
| | | | 429/218.1 |
| 9,012,073 B2* | 4/2015 | Kumar .............. | H01M 4/386 |
| | | | 429/206 |
| 10,629,895 B2* | 4/2020 | Troegel ............ | H01M 10/0525 |
| 2005/0214644 A1 | 9/2005 | Aramata et al. | |

(Continued)

FOREIGN PATENT DOCUMENTS

| | | |
|---|---|---|
| JP | 2005-310759 | 11/2005 |
| JP | 2017-007930 A | 1/2017 |

(Continued)

OTHER PUBLICATIONS

European Search Report dated Mar. 19, 2019.

*Primary Examiner* — Amanda C. Walke
(74) *Attorney, Agent, or Firm* — Lee IP Law, P.C.

(57) ABSTRACT

A negative active material for a rechargeable lithium battery includes a silicon-carbon composite including crystalline carbon and a silicon particle. The silicon-carbon composite further includes an alkali metal or an alkaline-earth metal. The alkali metal or the alkaline-earth metal is present in the silicon-carbon composite in an amount of greater than or equal to about 500 ppm and less than about 5,000 ppm by weight.

14 Claims, 2 Drawing Sheets

(56) References Cited

U.S. PATENT DOCUMENTS

| | | | |
|---|---|---|---|
| 2010/0069507 A1* | 3/2010 | Tabata | C01B 32/00 |
| | | | 514/769 |
| 2012/0258370 A1* | 10/2012 | Miyoshi | H01M 4/364 |
| | | | 429/231.6 |
| 2013/0252110 A1* | 9/2013 | Park | H01M 4/13 |
| | | | 429/231.8 |
| 2014/0242455 A1 | 8/2014 | Ryu et al. | |
| 2014/0287315 A1* | 9/2014 | Troegel | H01M 4/134 |
| | | | 429/231.8 |
| 2015/0243969 A1 | 8/2015 | Ku et al. | |
| 2016/0043390 A1 | 2/2016 | Shin et al. | |
| 2016/0164060 A1* | 6/2016 | Zhang | H01M 10/0525 |
| | | | 429/145 |
| 2016/0380265 A1 | 12/2016 | Kajita | |
| 2017/0012278 A1 | 1/2017 | Verma | |
| 2017/0110722 A1 | 4/2017 | Lee et al. | |
| 2018/0219216 A1* | 8/2018 | Choi | H01M 4/587 |
| 2019/0097222 A1* | 3/2019 | Feaver | H01M 4/386 |
| 2019/0177171 A1* | 6/2019 | Troegel | H01M 4/386 |
| 2019/0237753 A1* | 8/2019 | Ren | H01M 4/134 |

FOREIGN PATENT DOCUMENTS

| | | |
|---|---|---|
| KR | 10-2015-0101310 A | 9/2015 |
| KR | 10-2016-0018267 A | 2/2016 |
| KR | 10-1630008 B1 | 6/2016 |
| KR | 10-2017-0044360 A | 4/2017 |
| WO | WO 2007/055007 A1 | 5/2007 |

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2017-0148248, filed on Nov. 8, 2017, in the Korean Intellectual Property Office, and entitled: "Negative Active Material for Rechargeable Lithium Battery and Rechargeable Lithium Battery Including Same," is incorporated by reference herein in its entirety.

BACKGROUND

1. Field

Embodiments relate to a negative active material for a rechargeable lithium battery and a rechargeable lithium battery including the same.

2. Description of the Related Art

Technology development for realizing high capacity of a rechargeable lithium battery has been continuously made due to an increasing demand on a mobile equipment or a portable battery.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ ($0<x<1$), or the like, has been used.

As for a negative active material, various carbon-based materials such as artificial graphite, natural graphite, hard carbon, and the like or a Si-based active material such as Si, Sn, and the like have been used and particularly a Si-based active material has been mainly used in order to obtain high capacity.

As an electrolyte of a rechargeable lithium battery, a lithium salt dissolved in an organic solvent has been used.

SUMMARY

Embodiments are directed to a negative active material for a rechargeable lithium battery. The negative active material includes a silicon-carbon composite including crystalline carbon and a silicon particle. The silicon-carbon composite further includes an alkali metal or an alkaline-earth metal. The alkali metal or the alkaline-earth metal is present in the silicon-carbon composite in an amount of greater than or equal to about 500 ppm, and less than about 5,000 ppm by weight.

In the negative active material, the alkali metal or the alkaline-earth metal may be magnesium.

The silicon particle may have a ratio of $Si^{2+}$, $Si^{1+}$, and $Si^0$ of greater than or equal to about 60 at % in an X-ray photoelectron spectroscopy (XPS) analysis.

The silicon particle may have a ratio of $Si^{2+}$, $Si^{1+}$, and $Si^0$, relative to a total amount of silicon, of greater than or equal to about 60 at % in an X-ray photoelectron spectroscopy (XPS) analysis.

The alkali metal or the alkaline-earth metal may be present on a surface of the silicon-carbon composite or may be inside the silicon-carbon composite.

The silicon-carbon composite may further include oxygen. A content of the oxygen may be about 5 wt % to about 9 wt % based on a content of the silicon-carbon composite.

Embodiments are also directed to a negative electrode for a rechargeable lithium battery. The negative electrode includes a current collector and a negative active material layer including the negative active material as described herein.

Embodiments also provide a rechargeable lithium battery including the negative electrode as described above, a positive electrode including a positive active material, and a non-aqueous electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
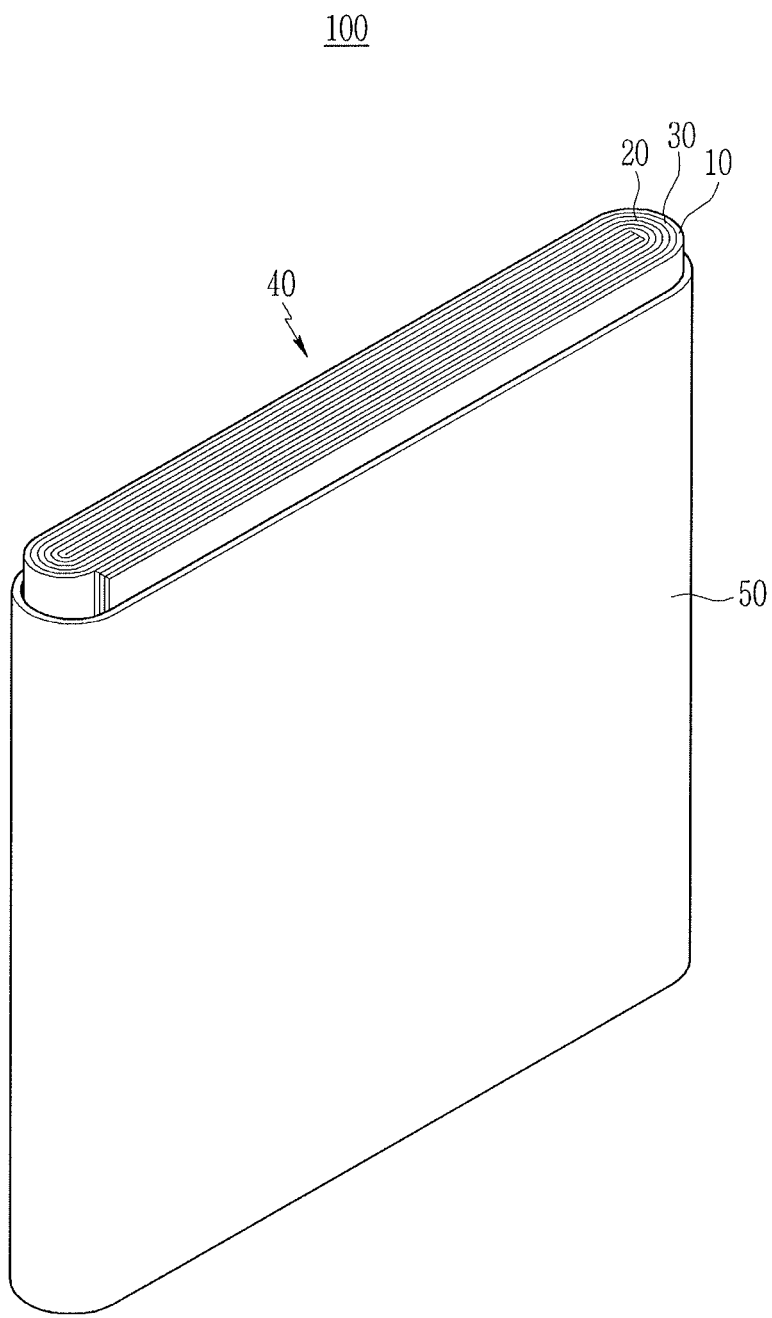
FIG. 1 illustrates a schematic view showing a structure of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A negative active material for a rechargeable lithium battery according to an embodiment includes a silicon-carbon composite including crystalline carbon and a silicon particle. The silicon-carbon composite further includes an alkali metal or an alkaline-earth metal. A content of the alkali metal or the alkaline-earth metal is greater than or equal to about 500 ppm and less than about 5,000 ppm based on a total weight of the silicon-carbon composite. For example, a content of the alkali metal or the alkaline-earth metal may be greater than or equal to about 600 ppm and less than about 5000 ppm based on that of the silicon-carbon composite. For example, a content of the alkali metal or the alkaline-earth metal may be greater than or equal to about 600 ppm and less than about 4900 ppm based on that of the silicon-carbon composite.

When the alkali metal or the alkaline-earth metal is included in an amount of greater than or equal to about 500 ppm and less than about 5,000 ppm based on a total content of the silicon-carbon composite, efficiency and a cycle-life characteristics of a negative electrode including this negative active material may be improved. For example, when a silicon negative electrode material is reduced by introducing an alkali metal or an alkaline-earth metal thereinto, efficiency of a negative electrode may be increased. However, introducing the alkali metal or alkaline-earth metal may create a risk of damaging the silicon structure and decreasing a cycle-life characteristics. According to an embodiment, the negative active material for a rechargeable lithium battery may be treated to include the alkali metal or the alkaline-earth metal in an amount of greater than or equal to about 500 ppm and less than about 5,000 ppm based on a total content of the silicon-carbon composite and thus may not only increase efficiency but also a cycle-life characteristics, since a silicon structure is not damaged. In addition, when the alkali metal or the alkaline-earth metal is included in an amount of greater than or equal to about 500 ppm and less than about 5,000 ppm, conductivity of the negative active material may be also improved.

The alkali metal or the alkaline-earth metal may play a role of increasing electrical conductivity, as compared to a silicon-based material without the alkali metal or the alkaline-earth metal. Accordingly, if the alkali metal or the alkaline-earth metal were to be included in an amount of less than 500 ppm, a cycle-life characteristics could be deteriorated due to an insufficient electrical conductivity improvement effect, and if the alkali metal or the alkaline-earth metal were to be included in an amount of greater than or equal to about 5,000 ppm, the alkali metal or the alkaline-earth metal could react with lithium ions and thus deteriorate the cycle-life characteristics.

The alkali metal or the alkaline-earth metal may be at least one selected from sodium, potassium, rubidium, cesium, francium, calcium, strontium, barium, radium, beryllium, and magnesium. For example, the alkali metal or the alkaline-earth metal may be magnesium.

The alkali metal or the alkaline-earth metal may be mixed in the form of a powder of the alkali metal or the alkaline-earth metal with an as-prepared silicon-carbon composite and heat-treated therewith to introduce the alkali metal or the alkaline-earth metal into the silicon-carbon composite.

The silicon-carbon composite may be a silicon-carbon composite including crystalline carbon and a silicon particle. The silicon-carbon composite may further include an amorphous carbon layer at least partially formed therein. The crystalline carbon may be artificial graphite, natural graphite, or a combination thereof. The amorphous carbon precursor may be coal pitch, mesophase pitch, petroleum pitch, charcoal-based oil, petroleum-based heavy oil, or a polymer resin such as a phenol resin, a furan resin, a polyimide resin, or the like.

Silicon may be included in a range of about 10 wt % to about 50 wt % based on a total weight of the silicon-carbon composite. The crystalline carbon may be included in a range of about 10 wt % to about 70 wt % based on a total weight of the silicon-carbon composite. The amorphous carbon may be included in a range of about 20 wt % to about 40 wt % based on a total weight of the silicon-carbon composite. The amorphous carbon coating layer may have a thickness ranging from about 5 nm to about 100 nm.

A core of the silicon-carbon composite may further include a pore. The silicon particle may have an average particle diameter (D50) ranging from about 10 nm to about 200 nm. As used herein, when a definition is not otherwise provided, an average particle diameter (D50) indicates a particle where an accumulated volume is about 50 volume % in a particle distribution.

The silicon-carbon composite may be mixed and heat-treated with alkali metal or alkaline-earth metal powder to prepare a silicon-carbon composite including an alkali metal or an alkaline-earth metal according to the present disclosure. For example, the silicon-carbon composite including an alkali metal or an alkaline-earth metal may be obtained through a heat treatment under an atmosphere including an alkali metal or alkaline-earth metal element. Alternatively, the silicon-carbon composite including an alkali metal or an alkaline-earth metal may be obtained by mixing the silicon-carbon composite with the alkali metal or alkaline-earth metal in a weight ratio of 100:1 to 5:5, and heat-treating the resulting mixture under a nitrogen or argon atmosphere.

An appropriate temperature for the heat treatment may be in a range of about 550° C. to about 700° C. An appropriate time for the heat treatment may be in a range of about 1 hour to about 10 hours or, for example, about 2 hours to about 5 hours.

Through this heat treatment, the silicon-carbon composite may be reduced, and the alkali metal or alkaline-earth metal may be introduced on the surface of or inside the silicon-carbon composite. For example, the silicon-carbon composite may have an oxygen content in a range of about 5 wt % to about 9 wt % due to the reduction of the silicon-carbon composite. After heat-treating, mixing of the heated product with an acidic solution may be further performed in order to control an amount of the alkaline metal or alkaline-earth metal to be a desirable amount due to a removal of part of the alkaline metal or alkaline-earth metal. The acidic solution may be a hydrochloric acid solution, an HF solution or a sulfuric acid solution, or a combination thereof, and may have a concentration of about 1 wt % to about 20 wt %. Further, in the acidic solution, the solvent may be water, and the mixing may be performed for about 1 hour to about 10 hours. For example, the oxygen content may be in a range of about 6 wt % to about 9 wt %, about 7 wt % to about 9 wt %, about 7 wt % to about 8.5 wt %, about 7.5 wt % to about 8.5 wt % or about 7.5 wt % to about 8.4 wt %. When the oxygen content is about 5 wt % or more, a significant deterioration of cycle-life characteristics may be avoided. When the oxygen content is about 9 wt % or less, irreversibility due to the oxygen and a decrease in efficiency may be avoided.

The extent to which a silicon-carbon composite is reduced by an alkali metal or an alkaline-earth metal may be examined by measuring a content of silicon atoms depending on an oxidation number (oxidation state) through an XPS analysis with respect to the silicon atoms. For example, when the alkali metal or the alkaline-earth metal is included in an amount of greater than or equal to about 500 ppm and less than about 5,000 ppm, a ratio of Si having an oxidation number of less than or equal to about 2, for example, a ratio of atoms that are $Si^0$, $Si^{1+}$, and $Si^{2+}$ is increased in the silicon particle and thus becomes greater than or equal to about 60 at %. A ratio of $Si^0$ may be in a range of about 15 at % to about 25 at %.

In the present disclosure, a negative active material including the silicon-carbon composite including the alkali metal or the alkaline-earth metal may be used alone or mixed with other negative active materials. For example, a first negative active material may be the silicon-carbon composite including the alkali metal or the alkaline-earth metal, and a second negative active material may be crystalline carbon. When at least two kinds of negative active materials are mixed, a mixing ratio thereof may be adjusted. A Si content may be adjusted to be in a range of about 3 wt % to about 50 wt % based on a total weight of the negative active materials.

According to an embodiment, a negative electrode for a rechargeable lithium battery may include a current collector and a negative active material layer formed on the current collector and including the negative active material.

In the negative active material layer, an amount of the negative active material may be about 95 wt % to about 99 wt % based on a total weight of the negative active material layer.

The negative active material layer may include a binder and, optionally, a conductive material. In the negative active material layer, an amount of the binder may be about 1 wt % to about 5 wt % based on a total weight of the negative active material layer. When the conductive material is further included, about 90 wt % to about 98 wt % of the negative active material, about 1 wt % to about 5 wt % of the binder, and about 1 wt % to about 5 wt % of the conductive material may be used.

The binder may improve binding properties of negative active material particles with one another and with a current collector. The binder may include a non-aqueous binder, an aqueous binder, or a combination thereof.

The non-aqueous binder may include polyvinylchloride, carboxylated polyvinylchloride, polyvinylfluoride, an ethylene oxide-containing polymer such as polyethylene oxide, polyvinylpyrrolidone, polyurethane, polytetrafluoroethylene, polyvinylidene fluoride, polyethylene, polypropylene, polyamideimide, polyimide, or a combination thereof.

The aqueous binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from ethylenepropylene copolymer, polyepichlorohydrin, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the aqueous binder is used as the negative electrode binder, a cellulose-based compound may be further used to provide viscosity as a thickener. The cellulose-based compound may include one or more of carboxymethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material may be included to provide electrode conductivity. A suitable electrically conductive material that does not cause chemical change may be used as a conductive material. Examples of the conductive material may include a carbon-based material such as natural graphite, artificial graphite, carbon black, acetylene black, ketjen black, a carbon fiber or the like; a metal-based material of a metal powder or a metal fiber including copper, nickel, aluminum, silver, or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

Another embodiment provides a rechargeable lithium battery including the negative electrode, a positive electrode, and a non-aqueous electrolyte.

The positive electrode may include a current collector and a positive active material layer formed on the current collector and including a positive active material.

The positive active material may be a compound (lithiated intercalation compound) being capable of intercalating and deintercalating lithium, for example, one or more composite oxides of a metal selected from cobalt, manganese, nickel, and a combination thereof, and lithium. Examples may include compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed using a method having no adverse influence on properties of a positive active material by using these elements in the compound. For example, the method may include a suitable coating method such as spray coating, dipping, or the like, as examples.

According to an embodiment, the positive active material may include at least two nickel-based positive active materials such as $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); and $Li_aNiG_bO_2$ ($0.90 \leq a \leq 1.8$, $0.001 \leq b \leq 0.1$), or a mixture of the nickel-based positive active material and a positive active material other than the nickel-based positive active material of the positive active material having the chemical formulae.

For example, the nickel-based positive active material may include $Li_aNi_{b1}Co_{c1}X_{d1}G_{z1}O_2$ (0.90≤a≤1.8, 0.5≤b1≤0.98, 0<c1≤0.3, 0<d1≤0.3, 0≤z1≤0.1, b1+c1+d1+z1=1, X is Mn, Al, or a combination thereof, G is Cr, Fe, Mg, La, Ce, Sr, V, or a combination thereof).

When the positive active material is prepared through the mixing as aforementioned, the mixing ratio may be adjusted depending on desired properties. For example, when the nickel-based positive active material is mixed with other active materials, the nickel-based positive active material may be used in an amount of about 30 wt % to about 97 wt % based on a total weight of a positive active material.

In the positive electrode, an amount of the positive active material may be about 90 wt % to about 98 wt % based on the total weight of the positive active material layer.

In an embodiment, the positive active material layer may further include a binder and a conductive material. Each content of the binder and the conductive material may be about 1 wt % to about 5 wt % based on the total weight of the positive active material layer.

The binder may improve binding properties of positive active material particles with one another and with a current collector. Examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon.

The conductive material may be included to provide electrode conductivity. A suitable electrically conductive material that does not cause a chemical change may be used as a conductive material. Examples of the conductive material include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative, or the like, or a mixture thereof.

The current collector may include an aluminum foil, a nickel foil, or a combination thereof, as examples.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, and the like. The ketone-based solvent may include cyclohexanone or the like. The alcohol-based solvent may include ethyl alcohol, isopropyl alcohol, or the like. Examples of the aprotic solvent may include nitriles such as R—CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, or the like.

The organic solvent may be used alone or in a mixture. When the organic solvent is used in a mixture, the mixture ratio may be controlled in accordance with a desirable battery performance.

The carbonate-based solvent may include a mixture with a cyclic carbonate and a linear (chain) carbonate. The cyclic carbonate and linear carbonate may be mixed together in a volume ratio of about 1:1 to about 1:9. When the mixture is used as an electrolyte, the electrolyte may have enhanced performance.

When the non-aqueous organic solvent is used in a mixture, the non-aqueous organic solvent may be a mixed solvent of cyclic carbonate and linear (chain) carbonate; a mixed solvent of cyclic carbonate and a propionate based solvent; or a mixed solvent of cyclic carbonate, linear carbonate, and a propionate based solvent. The propionate based solvent may be methylpropionate, ethylpropionate, propylpropionate, or a combination thereof.

When the cyclic carbonate and the linear carbonate or the cyclic carbonate and the propionate based solvent are mixed, they may be mixed in a volume ratio of about 1:1 to about 1:9. Thus, performance of an electrolyte solution may be improved. In addition, when the cyclic carbonate, the linear carbonate, and the propionate based solvent are mixed, they may be mixed in a volume ratio of about 1:1:1 to about 3:3:4. The mixing ratios of the solvents may be adjusted according to desirable properties.

The non-aqueous organic solvent may further include an aromatic hydrocarbon-based organic solvent in addition to the carbonate based solvent. The carbonate based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

[Chemical Formula 1]

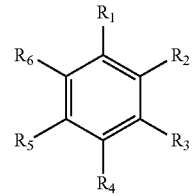

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4- diiodotoluene, 2,5-diiodotoluene, 2,3,4-triiodotoluene, 2,3,5-triiodotoluene, xylene, or a combination thereof.

The electrolyte may further include an additive of vinylene carbonate or an ethylene carbonate-based compound of Chemical Formula 2 in order to improve cycle life of a battery.

[Chemical Formula 2]

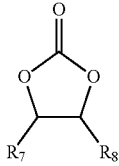

In Chemical Formula 2, $R_7$ and $R_8$ are the same or different and may be selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), and a fluorinated C1 to C5 alkyl group, provided that $R_7$ and $R_8$ are not simultaneously hydrogen.

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly adjusted to be within an appropriate range.

The lithium salt dissolved in an organic solvent may supply a battery with lithium ions to operate the rechargeable lithium battery. The lithium salt may improve the transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers (for example an integer ranging from 1 to 20), LiCl, LiI, and $LiB(C_2O_4)_2$(lithium bis(oxalato) borate: LiBOB). A concentration of the lithium salt may range from about 0.1 M to about 2.0 M. When the lithium salt is included in the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 illustrates a perspective view of a case and electrode assembly of a rechargeable lithium battery according to an embodiment. The rechargeable lithium battery according to an embodiment is illustrated as a prismatic battery. In some implementations, the rechargeable lithium battery may be one of variously-shaped batteries such as a cylindrical battery, a pouch battery, or the like.

Referring to FIG. 1, a rechargeable lithium battery 100 according to an embodiment may include an electrode assembly 40 manufactured by winding a separator 30 interposed between a positive electrode 10 and a negative electrode 20, and a case 50 housing the electrode assembly 40. An electrolyte) may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Flake-shaped artificial graphite fine particles having an average particle diameter of 10 μm were milled with a rotary mill to prepare an artificial graphite core having an average particle diameter of 10 μm. The fine particles were agglomerated with one another during the milling and formed closed and opened pores in an artificial graphite core. Porosity formed inside the graphite core during the agglomeration was 40%.

Subsequently, silicon was pulverized into silicon nano particles with a bead mill. An average particle diameter (D50) of the silicon nano particles was 100 nm.

The silicon nano particles were added to isopropyl alcohol to prepare a silicon nano particle liquid. The silicon nano particles were added in an amount so as not to be phase-separated from the isopropyl alcohol but to be prepared into slurry. Then, the artificial graphite core was combined with the silicon nano particle liquid. The silicon nano particle liquid was inserted into open pores inside the artificial graphite core due to a capillary phenomenon.

Subsequently, a product obtained therefrom was mixed with petroleum pitch, and the mixture was heat-treated at 900° C. for 3 hours to prepare a silicon-carbon composite. According to this heat treatment, the petroleum pitch was carbonized and converted into amorphous carbon and thus inserted into closed and opened pores inside the artificial graphite core and formed into a shell on the surface of the core.

The obtained silicon-carbon composite was mixed with magnesium powder (an average particle diameter of 44 μm) in a weight ratio of 10:1. The mixture was heat-treated at about 650° C. for about 2 hours under a nitrogen atmosphere to prepare a negative active material including the silicon-carbon composite including magnesium. A diluted hydrochloric acid solution in a concentration of 10 wt % (solvent: water) was prepared in order to remove a part of the magnesium in the active material, and the magnesium content in the negative active material was adjusted to 1075.9 ppm by weight by removing a part of the magnesium in the active material according to the Reaction Scheme below by mixing the diluted hydrochloric acid solution with the heated product for 6 hours.

$$MgO+2HCl \rightarrow MgCl_2+H_2O$$

The magnesium content was measured by using ICP-AES (Inductively Coupled Plasma Atomic Emission Spectroscopy).

97.5 wt % of the negative active material, 1.0 wt % of styrene-butadiene rubber and 1.5 wt % of carboxymethyl cellulose were mixed in a water solvent to prepare a negative active material slurry. The slurry was coated onto a Cu foil current collector and then, dried and compressed to manufacture a negative electrode.

The negative electrode, a positive electrode, and an electrolyte were used to manufacture a full-cell having theoretical capacity of 900 mAh. The positive electrode was prepared by mixing 97 wt % of $LiNi_{0.6}Co_{0.2}Al_{0.2}O_2$, 1.5 wt % of denka black, and 1.5 wt % of polyvinylidene fluoride in N-methyl pyrrolidone to prepare a positive active material slurry, coating the positive active material slurry on an Al foil current collector, drying the coated product and compressing the dried product. The electrolyte was prepared by dissolving 1.0 M $LiPF_6$ in ethylene carbonate and diethyl carbonate (in a volume ratio of 50:50).

EXAMPLE 2

A negative active material including a silicon-carbon composite including magnesium was prepared according to the same method as Example 1. However, a magnesium content of the negative active material was adjusted into 600.9 ppm by controlling a hydrochloric acid solution and reaction time.

The obtained negative active material was used to manufacture a negative electrode and a full-cell using the same according to the same method as Example 1.

EXAMPLE 3

A negative active material including a silicon-carbon composite including magnesium was prepared according to the same method as Example 1. However, a magnesium content in the negative active material was adjusted into 635.7 ppm by controlling a hydrochloric acid solution and reaction time.

The obtained negative active material was used according to the same method as Example 1 to manufacture a negative electrode and a full-cell using the same.

EXAMPLE 4

A negative active material including a silicon-carbon composite including magnesium was used according to the same method as Example 1. However, a magnesium content in the negative active material was adjusted into 4897.6 ppm by controlling a hydrochloric acid solution and reaction time. The obtained negative active material was used according to the same method as Example 1 to manufacture a negative electrode and a full-cell using the same.

Comparative Example 1

A negative active material including a silicon-carbon composite including magnesium was prepared according to the same method as Example 1. However, a magnesium content in the negative active material was adjusted into 338.5 ppm by controlling a hydrochloric acid solution and reaction time. The obtained negative active material was used according to the same method as Example 1 to manufacture a negative electrode and a full-cell using the same.

Comparative Example 2

A negative active material including a silicon-carbon composite including magnesium was prepared according to the same method as Example 1. However, a magnesium content in the negative active material was adjusted into 5328.1 ppm by controlling a hydrochloric acid solution and reaction time. The obtained negative active material was used according to the same method as Example 1 to manufacture a negative electrode and a full-cell using the same.

Each full-cell according to Examples 1 to 4 and Comparative Examples 1 and 2 was 100 times charged and discharged at 1 C within a range of 2.5 V to 4.2 V at 25° C. The capacity retention of each cell was obtained by calculating a discharge capacity ratio at the 100th cycle relative to the first cycle and evaluated as a cycle-life characteristic.

Figure 2:
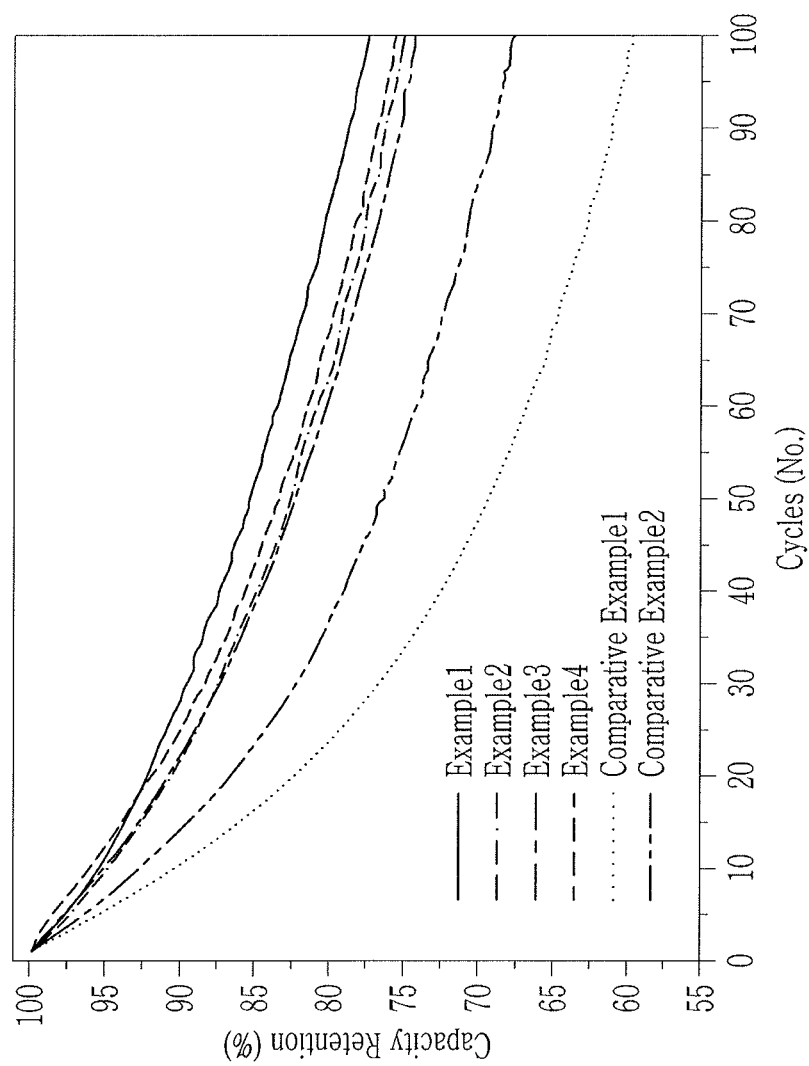
FIG. 2 illustrates a graph showing cycle-life characteristics of rechargeable lithium battery cells according to Examples 1 to 4 of the present disclosure and Comparative Examples 1 to 2.

The results are shown in Table 1 and FIG. 2.

TABLE 1

|  | Content of magnesium (ppm) | Capacity retention (%) |
|---|---|---|
| Example 1 | 1075.9 | 77.3 |
| Example 2 | 600.9 | 75.0 |
| Example 3 | 635.7 | 74.2 |
| Example 4 | 4897.6 | 75.6 |
| Comparative Example 1 | 338.5 | 59.7 |
| Comparative Example 2 | 5328.1 | 67.7 |

As shown in Table 1, the cells having a magnesium content in a range of greater than or equal to about 500 ppm and less than about 5,000 ppm according to Examples 1 to 4 showed a capacity retention of greater than or equal to 74%. On the other hand, when too little or too much magnesium was included out of the range of greater than or equal to 500 ppm and less than 5,000 ppm according to Comparative Examples 1 and 2, the cells thereof exhibited too low a capacity retention and thus exhibited deteriorated cycle-life characteristics.

Oxygen Content Measurement and XPS Analysis

An XPS surface analysis of the negative active materials according to Examples 1 to 4 and Comparative Examples 1 and 2 was performed, and the oxygen content of each was measured.

The oxygen content was calculated as wt % by heating each negative active material sample of Examples 1 to 4 and Comparative Examples 1 and 2 up to a maximum of 3000° C. and analyzing CO and $CO_2$ generated therefrom using an infrared ray measuring device. The oxygen content results are shown in Table 2.

In addition, the XPS surface analysis was performed by attaching a carbon double-sided adhesive tape to a metal plate, respectively coating the negative active material samples according to Examples 1 to 4 and Comparative Examples 1 and 2 to a thickness that did not allow the double-sided tape to be visible, for example, to be thick enough to cover the double-sided adhesive tape, compressing the coated double-sided tape to have a flat surface, and then, fixing the compressed coated double-sided tape in a folder to conduct X-ray photoelectron spectrometry. As a result, a ratio of Si atoms depending on an oxidation number from the XPS spectrum composition analysis was shown in Table 2. An ESCA 250 spectrometer was used for the X-ray photoelectron spectrometry.

TABLE 2

|  | Content of oxygen (wt %) | Si⁰ (at %) | Si⁺¹ (at %) | Si⁺² (at %) | Si⁰ + Si⁺¹ + Si⁺² (at %) | Si⁺³ (at %) | Si⁺⁴ (at %) |
|---|---|---|---|---|---|---|---|
| Example 1 | 8.4 | 22.9 | 15.3 | 24.9 | 63.1 | 31.4 | 5.4 |
| Example 2 | 8.0 | 14.5 | 21.8 | 33.2 | 69.5 | 24.0 | 6.4 |
| Example 3 | 7.5 | 18.7 | 20.6 | 23.6 | 62.9 | 32.7 | 4.4 |
| Example 4 | 8.1 | 21.9 | 19.4 | 21.0 | 62.3 | 28.7 | 9.0 |
| Comparative Example 1 | 4.8 | 23.5 | 7.1 | 18.1 | 48.7 | 47.6 | 3.8 |
| Comparative Example 2 | 9.2 | 11.6 | 23.8 | 15.9 | 51.3 | 42.8 | 5.9 |

As shown in Table 2, an oxygen content was in a range of about 5 wt % to about 9 wt % due to an appropriate reduction through a magnesium heat treatment in Examples 1 to 4. On the other hand, Comparative Examples 1 and 2 having a magnesium content outside a range of greater than or equal to 500 ppm and less than 5,000 ppm also exhibited an oxygen content outside a range of about 5 wt % to about 9 wt % and thus exhibited a deteriorated effect in terms of efficiency and a cycle-life characteristics.

In addition, Examples 1 to 4 showed a ratio of Si atoms having oxidation number of less than or equal to 2 of Si atoms due to appropriate reduction through a magnesium heat treatment in a range of greater than or equal to 60 at % and particularly, a Si⁰ ratio in a range of 15 at % to 25 at %.

By way of summation and review, recently, mobile information terminal devices have been rapidly down-sized and lightened. Thus, a higher capacity of the rechargeable lithium battery used as the driving power source of such devices has become desirable. In addition, in order to use the rechargeable lithium battery as an actuating power source or as a power storage source for a hybrid vehicle or an electric vehicle, research on development of a battery having satisfactory high rate capability, being rapidly charged and discharged, and having excellent cycle characteristics has been actively conducted.

Embodiments provide a negative active material for a rechargeable lithium battery that provides excellent cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A negative active material for a rechargeable lithium battery, the negative active material comprising:
a silicon-carbon composite including crystalline carbon and a silicon particle,
wherein:
the silicon-carbon composite further includes an alkali metal or an alkaline-earth metal, and
the alkali metal or the alkaline-earth metal is present in the silicon-carbon composite in an amount of greater than 1,000 ppm and less than about 5,000 ppm by weight.

2. The negative active material as claimed in claim 1, wherein in the negative active material, the alkali metal or the alkaline-earth metal is magnesium.

3. The negative active material as claimed in claim 1, wherein the silicon particle has a ratio of $Si^{2+}$, $Si^{1+}$, and $Si^{0}$, relative to a total amount of silicon, of greater than or equal to about 60 at % in an X-ray photoelectron spectroscopy (XPS) analysis.

4. The negative active material as claimed in claim 3, wherein the silicon particle has a ratio of $Si^{0}$ of about 15 at % to about 25 at % in an X-ray photoelectron spectroscopy (XPS) analysis.

5. The negative active material as claimed in claim 1, wherein the alkali metal or the alkaline-earth metal is present on a surface of the silicon-carbon composite or is inside the silicon-carbon composite.

6. The negative active material as claimed in claim 1, wherein:
the silicon-carbon composite further includes oxygen in an amount of about 5 wt % to about 9 wt % based on a total weight of the silicon-carbon composite.

7. A negative electrode for a rechargeable lithium battery, the negative electrode comprising:
a current collector; and
a negative active material layer including the negative active material as claimed in claim 1.

8. A rechargeable lithium battery, comprising:
the negative electrode as claimed in claim 7;
a positive electrode including a positive active material;
a separator, and
a non-aqueous electrolyte.

9. The rechargeable lithium battery as claimed in claim 8, wherein the separator is a multi-layer separator.

10. The rechargeable lithium battery as claimed in claim 8, wherein the separator includes polyvinylidene fluoride.

11. The rechargeable lithium battery as claimed in claim 8, wherein the non-aqueous electrolyte includes a carbonate-based solvent and a propionate based solvent.

12. The rechargeable lithium battery as claimed in claim 11, wherein the propionate based solvent is at least one of methylpropionate, ethylpropionate, propylpropionate, or a combination thereof.

13. The rechargeable lithium battery as claimed in claim 8, wherein the non-aqueous electrolyte includes at least one of vinylene carbonate and fluoroethylene carbonate.

14. A negative active material for a rechargeable lithium battery, the negative active material comprising a silicon-carbon composite including crystalline carbon, a silicon particle, and magnesium,
wherein the magnesium is present in the silicon-carbon composite in an amount of greater than or equal to about 500 ppm and less than about 5,000 ppm by weight.

* * * * *